United States Patent [19]

Smith

[11] Patent Number: 5,509,497
[45] Date of Patent: Apr. 23, 1996

[54] STEERABLE WHEEL DRIVE ASSEMBLY

[75] Inventor: James E. Smith, Lafayette, Ind.

[73] Assignee: Fluidrive, Inc., Brookston, Ind.

[21] Appl. No.: 224,032

[22] Filed: Apr. 7, 1994

[51] Int. Cl.$^6$ ................................................ B60K 7/00
[52] U.S. Cl. ........................... 180/308; 180/253; 180/263
[58] Field of Search .................................. 180/308, 305, 180/237, 253, 263, 244

[56] References Cited

U.S. PATENT DOCUMENTS

| | | | |
|---|---|---|---|
| 1,166,598 | 1/1916 | Keene | 180/253 |
| 3,302,741 | 2/1967 | Brazuk | 180/253 X |
| 3,443,655 | 5/1969 | Beck et al. | 180/253 X |
| 3,458,005 | 7/1969 | Malm et al. | 180/253 X |
| 3,480,099 | 11/1969 | Nighswonger et al. | 180/253 X |
| 3,720,278 | 3/1973 | Bunchak et al. | 180/253 X |
| 3,727,938 | 4/1973 | Goodbary et al. | 180/253 X |
| 3,804,190 | 4/1974 | Shaffer | 180/308 X |
| 4,546,844 | 10/1985 | Stauffer | 180/308 X |

OTHER PUBLICATIONS

"Mud Hog System II and System 3 Rear Wheel Drive" Technical Manual, Mar. 1990.

Primary Examiner—Margaret A. Focarino
Assistant Examiner—F. Zeender
Attorney, Agent, or Firm—George Pappas

[57] ABSTRACT

A steering wheel drive assembly for steerable wheels of vehicles. A hydraulic motor is provided for driving the wheel and includes a fluid distribution assembly located between the bearing assembly and piston drive assembly. Upper and lower bores are provided in the distribution assembly cover and extension arms attached to the vehicle chassis extend over the bores and are provided with pivot pins detachably attached to the extension arms and extending into the distribution cover bores. The distribution cover bores are coaxial and thereby allow the fluid motor to pivot about an axis of rotation. The motor axis of rotation is preferably colinear with the vertical center line of the steerable wheel. Sleeve bearings are provided within the distribution cover bores and thrust bearings are provided inbetween the extension arms and the distribution cover.

21 Claims, 2 Drawing Sheets

STEERABLE WHEEL DRIVE ASSEMBLY

TECHNICAL FIELD

The present invention relates to the technical field of drive assemblies for steerable wheels of vehicles. More particularly, the present invention relates to a steering wheel drive assembly including a fluid drive motor pivotally mounted on a vehicle and in driving engagement with a wheel used for steering the vehicle.

BACKGROUND OF THE INVENTION

Vehicles such as combines, construction fork trucks, and road pavers, are today quite often equipped with wheels used for steering the vehicle and which are also driven by a fluid or hydraulic motor. It is desirable to equip the steerable wheels with hydraulic powered motors so as to assist in driving the vehicle and obtaining better performance in rough and slippery terrain, such as muddy fields and construction sites.

Typically, as shown in FIG. 1, a hydraulic motor M is pivotally mounted on a vehicle chassis C for pivotal movement about axis X. A wheel W having a rim R is detachably attached to the motor shaft S and has a vertical centerline L. Hydraulic fluid at a substantially high pressure is selectively provided to motor M via lines (not shown) for selectively driving wheel W as needed. Additionally, tie rods are pivotally connected to motor M and are selectively caused to move via the vehicle steering wheel for selectively pivoting motor M and wheel W about axis X and thereby steering the wheel and providing control of the vehicle in the desired direction.

Many different hydraulic motors M are available for use in such applications. In general, these motors include a bearing assembly circumscribing shaft S and located closest to the portion of shaft S extending out of motor M toward rim R. The motor M further includes a piston drive assembly next to the bearing assembly and a fluid distribution assembly next to the piston drive assembly. Thus, the piston drive assembly is located inbetween the bearing assembly and the drive assembly. The distribution assembly distributes the high pressure fluid to the plurality of pistons in the drive assembly which under proper timing, force rollers against a cam and thereby drive shaft S for turning wheel W. The distribution of hydraulic fluid and overall operation of such hydraulic motors is well known and such motors are currently available from sources such as Poclain, Rexroth, Deere & Company and Valmet.

Unfortunately, the prior art steering wheel drive assemblies have shortcomings and drawbacks. Because of the longitudinal length and diameter of motor M, it becomes quite difficult to fit the assembly within the cup-shaped rim R and, as a consequence, the design requires the pivot to be about axis X which is at an angle with respect to the centerline L of wheel W. As a further consequence, there is an undesirable swing distance equal to the distance between axis X and centerline L. As wheel W and motor M are pivoted about axis X, the upper end of wheel W tends to swing with respect to axis X. Furthermore, the prior steering wheel drive assemblies require the diameter of the wheel W to be matched to the assembly so that the intersection of axis X and centerline L occurs generally at the point of contact between wheel W and the ground. If the wheel diameter is not properly matched, the lower end of the wheel will also be subjected to a swing movement during turning. Further yet, in view of the swing distance between axis X and centerline L, the overall steering angle (the overall angle that wheel W can be pivoted about centerline L) is generally limited and, a generally larger vehicle tire envelope is required for overall smaller steering angles.

Accordingly, a need exists for a steering wheel drive assembly that improves the prior art assemblies and provides a shorter or no swing distance for all different diameter wheels and which provides a larger steering angle while requiring an overall small vehicle tire envelope.

SUMMARY OF THE INVENTION

It is the principal object of the present invention to overcome the above-discussed disadvantages associated with prior steering wheel drive assemblies.

The present invention overcomes the disadvantages associated with prior steering wheel drive assemblies by providing a fluid or hydraulic motor having a distribution assembly located between the bearing and piston drive assemblies and with the bearing assembly located closest to the drive shaft portion adapted for attachment to the rim of the wheel. In this fashion, a distribution assembly cover can be provided around the fluid distribution assembly which has sufficient thickness for pivotally attaching the motor thereat. More particularly, the distribution assembly cover is provided with an upper bore and a lower bore extending generally toward the distribution assembly. Both bores are coaxial with the axis of rotation. A pair of extension arms are mounted to the vehicle chassis and extend over the upper and lower bores and pivot pins which are selectively detachably attachable to the extension arms extend into the bores. The extension arms and pins take up a relatively small amount of space and, thus, the motor is easily fitted in the wheel rim and with the axis of rotation being colinear with the wheel centerline. Accordingly, the steering wheel drive assembly eliminates the prior known swing distance for all different diameter tires while increasing the wheel steering angle and requiring a generally smaller vehicle tire envelope.

In one form thereof, the present invention is directed to a steering wheel drive assembly for a vehicle and includes a fluid drive motor having a wheel shaft extending out therefrom for attachment to a wheel. The drive motor includes a bearing assembly, a piston drive assembly, and a fluid distribution assembly. The distribution assembly is located between the bearing and piston drive assemblies and the bearing assembly is located closest to the extending shaft portion. The drive motor is pivotally attached to the vehicle for allowing pivotal motion of the drive motor about an axis of rotation extending through the distribution assembly.

Preferably, the axis of rotation is generally perpendicular to the wheel shaft and is also generally colinear with the wheel vertical centerline. A distribution assembly cover is provided around the fluid distribution assembly and an upper bore and a lower bore are each formed in the distribution assembly cover. Each of the bores extend toward the distribution assembly and are coaxial with the axis of rotation. A pair of extension arms are connected together through a base portion and the base portion is adapted for mounting to the vehicle. The extension arms extend over the distribution assembly cover bores and pivot pins are attached to the extension arms and are received within the bores. A sleeve bearing is provided in each of the bores and receive the pivot pins. A thrust bearing is provided between each of the extension arms and the distribution assembly cover and the pivot pins extend through a hole in each of the thrust bearings. A lubricating port is provided in each of the pivot pins for selectively introducing a lubricant in the bores. Yet more preferably, the extension arms are provided with threaded bores and the pivot pins include a threaded section for being threadingly received in the threaded bores thereby making the pivot pins detachably attachable on the extension arms and selectively received in the bores.

BRIEF DESCRIPTION OF THE DRAWINGS

The above-mentioned and other features and objects of this invention and the manner of obtaining them will become more apparent and the invention itself will be better understood by reference to the following description of embodiments of the invention taken in conjunction with the accompanying drawings wherein.

Corresponding reference characters indicate corresponding parts throughout the several views of the drawings.

The exemplifications set out herein illustrate preferred embodiments of the invention in one form thereof and such exemplifications are not to be construed as limiting the scope of the disclosure or the scope of the invention in any manner.

DETAILED DESCRIPTION OF A SPECIFIC EMBODIMENT

Figure 1:
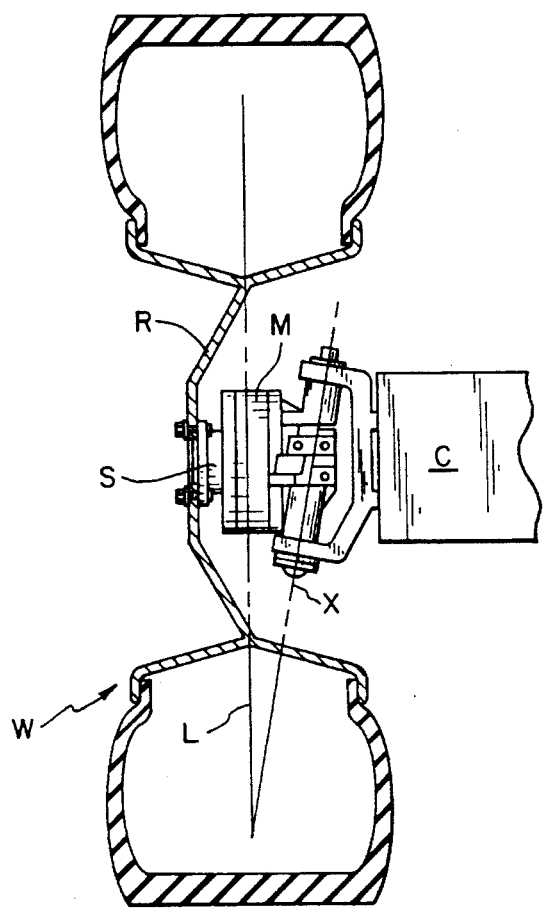
FIG. 1 is a side elevation view of a prior art steering wheel drive assembly and shown mounted on a vehicle chassis and with the wheel attached thereto.
Figure 2:
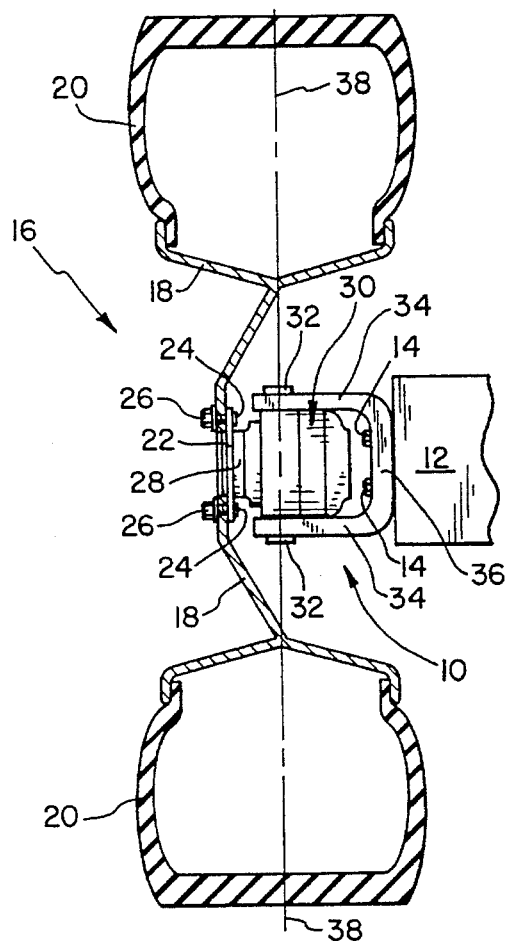
FIG. 2 is a side elevation view of a steering wheel drive assembly according to the present invention and shown mounted on a vehicle chassis and with a wheel attached in driving engagement.

Referring initially to FIG. 2, there is shown a steering wheel drive assembly generally indicated by the numeral 10 mounted on a vehicle chassis 12 via bolts 14 or other suitable means. A wheel 16 including a rim 18 and rubber tire 20 is attached to a wheel hub 22 using studs 24 and nuts 26. Hub 22 is, in turn, affixed to motor shaft 28, a portion of which extends out of fluid or hydraulic motor 30. As more fully discussed hereinbelow, motor 30 is pivotally attached to chassis 12 via pivot pins 32 and a U-shaped bracket consisting of extension arms 34 and base portion 36. Additionally, motor 30 is pivotally mounted so as to pivot about axis 38 which is colinear with the vertical centerline of wheel 16.

Figure 3:
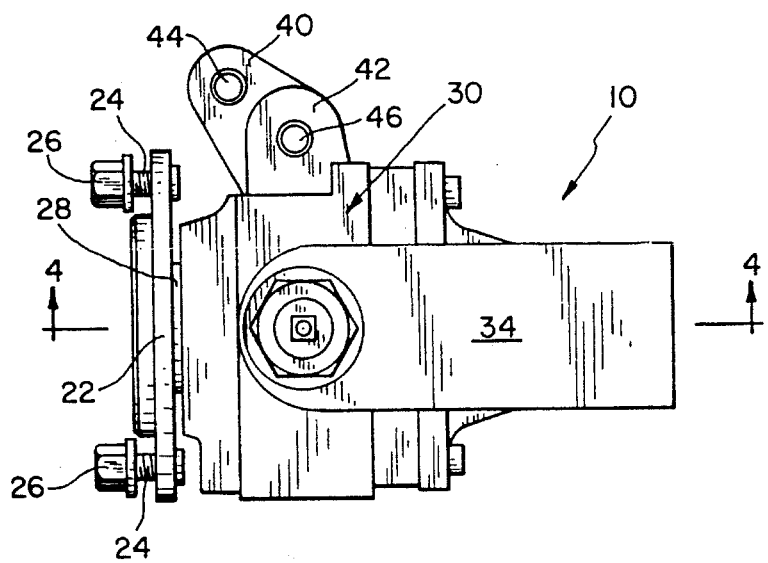
FIG. 3 is a partial top plan view of the steering wheel drive assembly shown in FIG. 2; and, FIG. 4 is a cross-sectional view of the steering wheel drive assembly shown in FIG. 3 taken along line 4—4.

As shown in FIG. 3, a pair of ears 40 and 42 are affixed to motor 30 and extend outwardly therefrom and include holes 44 and 46 respectively. Tie rods and steering cylinders (not shown) are connected to ears 40 and 42 via respective holes 44 and 46 in a known and customary manner for providing the necessary forces and causing motor 30 to pivot about pivot axis 38.

Figure 4:
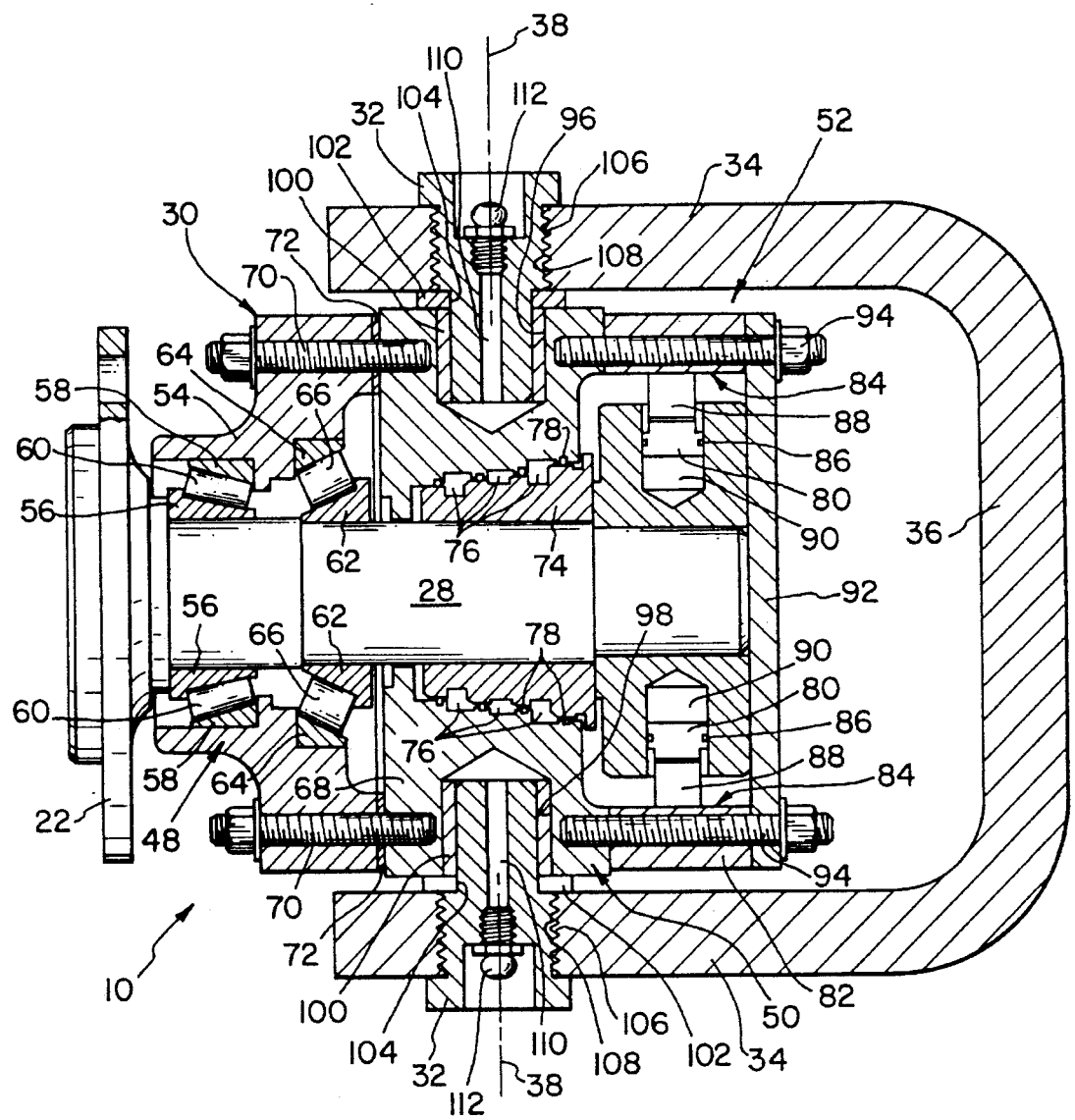

Referring now to FIG. 4, fluid motor 30 includes a bearing assembly section 48, a fluid distribution assembly section 50, and a piston drive assembly section 52. As shown, the fluid distribution assembly 50 is located between bearing assembly 48 and piston drive assembly 52 and, further, the bearing assembly section is located closest to the shaft 28 portion extending out of motor 30 and which is connected to wheel hub 22. Bearing assembly 48 includes a bearing assembly cover 54 circumscribing shaft 28 and an outer bearing comprising an inner race 56, outer race 58 and bearings 60 therebetween. Additionally, an inner bearing is provided comprising an inner race 62, outer race 64, and bearings 66. Bearing assembly cover 54 is attached to a fluid distribution assembly cover 68 via nut and bolt combinations 70 and a seal 72. It is noted that although both outer and inner bearings 60 and 66 are depicted for greater stability, only one such bearing is needed. That is, in some applications, only inner race 56 and bearings 60 would be needed.

The distribution assembly section includes a cover 68 generally circumscribing shaft 28. A distributor valve block 74 also circumscribes shaft 28 creating a plurality of annular ports 76 between the valve block 74 and cover 68. Distribution seals 78 are provided between ports 76. A fluid under high pressure is supplied to the fluid distribution assembly section 50 through exterior high pressure hoses or lines (not shown) and the valve block 74 distributes that fluid to the plurality of pistons 80 of the drive assembly section 52 for driving shaft 28 in a known and customary manner.

The piston drive assembly section 52 includes an outer cam ring with an inner surface 84 shaped in a sinusoidal fashion (not shown) in a known and customary manner. Pistons 80 include piston rings 86 and are adapted for pushing rollers 88 radially outwardly against inner surface 84 of cam ring 82. Accordingly, high pressure fluid is selectively directed by the fluid distribution assembly 50 to chambers 90 thereby pushing pistons 80 and rollers 88 outwardly at the appropriate time for interacting with the sinusoidally-shaped surface 84 of cam ring 82 and driving shaft 28 about its longitudinal axis. Piston drive assembly 52 further includes an end cover 92 which together with cam ring 82 are attached to fluid distribution assembly cover 68 via nut and bolt combinations 94.

Advantageously, because the fluid distribution assembly cover 68 is located inbetween the bearing assembly section 48 and piston drive assembly section 52, and further because the distribution valve block 74 is relatively small in diameter, the radial thickness of the fluid distribution assembly cover 68 can be of sufficient radial thickness to receive an upper bore 96 and lower bore 98. Bores 96 and 98 are coaxial with the axis of rotation 38. A sleeve bearing 100 is received within each of upper and lower bores 96 and 98. Additionally, a thrust bearing 102 is located between distribution assembly cover 68 and extension arms 34 at each of the upper and lower bores 96 and 98. Thrust bearings 102 are provided with a hole 104 for receiving pivot pins 32 therethrough. It is noted that only the upper thrust bearing experiences compressive forces and that the lower thrust bearing is not always needed. Indeed, the lower thrust bearing can be eliminated altogether for most applications.

Pivot pins 32 are selectively detachably attachable onto extension arms 34 and, in this regard, are provided with a threaded section 106 threadingly received within threaded bores 108 in upper and lower extension arms 34. Thus, pivot pins 32 are selectively received within bores 96 and 98 by threading pins 32 in position as shown and, thereby, also locking motor 30 in position for pivoting about axis 38.

Pivot pin 32 is further provided with a lubricating port 110 for introducing a lubricant such as grease within bores 96 and 98 and around sleeve bearings 100 and thrust bearings 102. A grease nipple 112 can also be provided for forcing lubricant into port 110 as may be needed from time to time.

While the invention has been described as having a specific embodiment, it will be understood that it is capable of further modification. This application is, therefore, intended to cover any variations, uses, or adaptations of the invention following the general principles thereof and including such departures from the present disclosure as come within known or customary practice in the art to which this invention pertains.

What is claimed is:

1. A steering wheel drive assembly for a vehicle comprising:

a fluid drive motor having a wheel shaft extending out therefrom for attachment to a wheel;

wherein said drive motor includes a bearing assembly, a piston drive assembly and a fluid distribution assembly for delivering fluid to said piston drive assembly, said distribution assembly located between said bearing and piston drive assemblies; and, pivot attachment means for mounting said drive motor to said vehicle and allowing pivotal motion of said drive motor about an axis of rotation extending through said distribution assembly.

2. The steering wheel drive assembly of claim 1 wherein said axis of rotation is generally perpendicular to said wheel shaft.

3. The steering wheel drive assembly of claim 1 further comprising a distribution assembly cover around said fluid distribution assembly and wherein said pivot attachment means is pivotally attached to said distribution assembly cover.

4. The steering wheel drive assembly of claim 3 further comprising an upper bore and a lower bore each formed in said distribution assembly cover, said bores extending generally toward said distribution assembly and being coaxial with said axis of rotation, said pivot attachment means including upper and lower extension arms mounted to said vehicle and extending over said respective upper and lower bores, and upper and lower pivot pins attached to said respective upper and lower extension arms and received in said respective upper and lower bores.

5. The steering wheel drive assembly of claim 4 wherein said extension arms are connected together through a base portion, said base portion adapted for mounting to a vehicle.

6. The steering wheel drive assembly of claim 4 further comprising a sleeve bearing in each of said bores receiving said pivot pins.

7. The steering wheel drive assembly of claim 4 further comprising a thrust bearing between said upper extension arm and said distribution assembly cover, said upper pivot pin extending through a hole in said thrust bearing.

8. The steering wheel drive assembly of claim 4 further comprising a thrust bearing between each of said extension arms and said distribution assembly cover, said pivot pins extending through a hole in each of said thrust bearings.

9. The steering wheel drive assembly of claim 4 further comprising a lubricating port in each of said pivot pins for introducing a lubricant in said bores.

10. The steering wheel drive assembly of claim 4 further comprising threaded bores in each of said extension arms and wherein said pivot pins include a threaded section for being threadingly received in said threaded bores, whereby said pivot pins are detachably attachable on said extension arms and selectively received in said bores.

11. The steering wheel drive assembly of claim 4 further comprising:

a sleeve bearing in each of said bores receiving said pivot pins; and, a thrust bearing between said upper extension arm and said distribution assembly cover, said upper pivot pin extending through a hole in said thrust bearing.

12. The steering wheel drive assembly of claim 11 further comprising a lubricating port in each of said pivot pins for introducing a lubricant in said bores.

13. The steering wheel drive assembly of claim 11 further comprising threaded bores in each of said extension arms and wherein said pivot pins include a threaded section for being threadingly received in said threaded bores, whereby said pivot pins are detachably attachable on said extension arms and selectively received in said bores.

14. The steering wheel drive assembly of claim 4 further comprising:

a sleeve bearing in each of said bores receiving said pivot pins; and, a thrust bearing between each of said extension arms and said distribution assembly cover, said pivot pins extending through a hole in each of said thrust bearings.

15. The steering wheel drive assembly of claim 2 further comprising a distribution assembly cover around said fluid distribution assembly and wherein said pivot attachment means is pivotally attached to said distribution assembly cover.

16. The steering wheel drive assembly of claim 15 further comprising an upper bore and a lower bore each formed in said distribution assembly cover, said bores extending generally toward said distribution assembly and being coaxial with said axis of rotation, said pivot attachment means including upper and lower extension arms mounted to said vehicle and extending over said respective upper and lower bores, and upper and lower pivot pins attached to said respective upper and lower extension arms and received in said respective upper and lower bores.

17. The steering wheel drive assembly of claim 16 further comprising a sleeve bearing in each of said bores receiving said pivot pins.

18. The steering wheel drive assembly of claim 16 further comprising a thrust bearing between said upper extension arm and said distribution assembly cover, said upper pivot pin extending through a hole in said thrust bearing.

19. The steering wheel drive assembly of claim 16 further comprising a lubricating port in each of said pivot pins for introducing a lubricant in said bores.

20. The steering wheel drive assembly of claim 16 further comprising threaded bores in each of said extension arms and wherein said pivot pins include a threaded section for being threadingly received in said threaded bores, whereby said pivot pins are detachably attachable on said extension arms and selectively received in said bores.

21. The steering wheel drive assembly of claim 2 wherein said axis of rotation is generally colinear with a wheel vertical centerline.

\* \* \* \* \*